3,838,098
MOLDABLE COMPOSITIONS BASED ON TRANS-1,4-POLYMERS OF ISOPRENE
Eric George Kent, Sarnia, Ontario, Canada, assignor to Polymer Corporation Limited, Sarnia, Ontario, Canada
No Drawing. Filed Oct. 26, 1972, Ser. No. 300,983
Claims priority, application Canada, Dec. 20, 1971, 130,461
Int. Cl. C08f 45/04
U.S. Cl. 260—41.5 R                    9 Claims

ABSTRACT OF THE DISCLOSURE

Moldability of raw compounds based on trans-1,4 polymer of isoprene and hardness of cured molded articles made therefrom are improved by mixing therewith a crystalline copolymer of isoprene and acrylonitrile.

The compounds are suitable for the production of improved golf ball covers.

---

This invention relates to moldable compositions and in particular to compositions suitable for use in the production of improved golf balls.

A usual method for preparing golf balls is to securely cover a core consisting of elastic thread wound under tension so as to provide a precisely balanced core with two half shells of a cover material. The cover material is either a composition of natural balata rubber or a composition of highly crystalline trans-1,4-polyisoprene.

The cover material must be durable to various punishments such as exposure to a variety of weather conditions and blows from golf clubs yet must be moldable to precise configuration which is important to the flight functions of the ball. Durability of the cover material and moldability are conflicting properties. When one is improved, the other falls off to an unsatisfactory level.

It is an object of this invention to overcome deficiencies of the prior art and to provide an improved moldable composition suitable for the preparation of golf ball covers. Another object is to provide improved golf balls with covers made of such improved compositions.

It has been found that the moldability of a composition based on a crystalline trans-1,4 polymer of a conjugated alkadiene is improved on the addition of a crystalline copolymer of certain alkadienes and acrylic nitrile. It has been further found that the compositions based on the blend of the above two crystalline polymers cure to hard and cut-resistant vulcanizates.

This invention provides a curable composition of improved moldability which comprises a mixture of:

(A) a crystalline copolymer of substantially equimolar amounts of a conjugated $C_{4-10}$ alkadiene and an acrylic nitrile, said alkadiene containing not less than about 40 mole percent of a 2-alkyl butadiene, and (B) a crystalline hydrocarbon polymer of a $C_{4-10}$ conjugated alkadiene having at least 85% of alkadiene units in the trans-1,4 configuration, said mixture containing from about 40 to about 99 weight percent of polymer (B), based on the weight of (A) and (B).

The above composition is suitable for the production of improved golf ball covers. The cover composition of this invention is preferably sulfur-cured.

The first essential polymeric component of the composition of this invention is a crystalline copolymer of substantially equimolar amounts of a conjugated $C_{4-10}$ alkadiene and an acrylic nitrile. The conjugated alkadiene in the above copolymer may be a 2-alkyl butadiene-1,3 containing 1–6 carbon atoms in the alkyl group or a mixture of the 2-alkyl butadiene-1,3 with another conjugated alkadiene containing 4 to 10 carbon atoms such as butadiene-1,3, pentadiene-1,3. The mixture should contain not less than about 40 mole percent of the 2-alkyl butadiene-1,3. The preferred 2-alkyl butadiene-1,3 is isoprene although 2-ethyl butadiene-1,3, 2,3-dimethyl butadiene-1,3 can also be used. The preferred mixture of alkadienes contains 50–80 mole percent of isoprene and 20–50 mole percent of butadiene-1,3. The monomeric units of the alkadiene in the copolymer of this invention are predominantly, preferably at least 75%, in the trans-1,4 configuration. The acrylic nitrile in the crystalline copolymer is selected from acrylonitrile, methacrylonitrile, alkyl substituted acrylonitriles containing 2–6 carbon atoms in the alkyl group and vinylidene cyanide; the preferred nitrile is acrylonitrile. The monomeric units of the acrylic nitrile alternate to a high degree of at least 90% with the monomeric units of alkadienes. The preferred copolymer is essentially free of monomer doublets of the type: nitrile-nitrile, isoprene-other alkadiene, isoprene-isoprene, as can be determined by the infra-red (IR) method and nuclear magnetic resonance (NMR) method.

The above copolymer is a crystalline solid material at a temperature of about 25° C. Above the melting temperature, which ranges between about 60° C. and 110° C., the copolymer softens to a viscous somewhat tacky mass. The crystallinity ranges from about 5% to about 35%, depending on the amount of 2-alkyl butadiene-1,3 present in the copolymer in the trans-1,4 configuration. The rate of crystallization varies within a wide range. It may take up to 7 days at room temperature for the copolymer containing 25 mole percent isoprene, 25 mole percent of other alkadiene and 50 mole percent of acrylonitrile to crystallize to a degree as specified above. On the other hand, a 1:1 alternating copolymer of isoprene and acrylonitrile can crystallize within as little as 10 minutes.

The crystalline copolymer used in this invention is a novel copolymer which can be prepared by a copolymerization process in the presence of a complex catalyst comprising, for example, an organo-aluminum halide complexed with an acrylic nitrile and a transition metal compound. Representative examples of such catalyst are a complex of ethyl aluminum chloride with acrylic nitrile and vanadium oxychloride; aluminum chloride or zinc chloride complex with acrylonitrile; vanadium or chromium oxychloride and benzoyl peroxide. The transition metal compound is used in an amount less than the equimolar amount with respect to the aluminum compound. The process of copolymerizing an alkadiene as hereinabove defined and an acrylic nitrile to form a crystalline copolymer of this invention is a modification of processes described in British Patent Specifications 1,186,462 and 1,231,327. These prior art processes are directed to the preparation of amorphous copolymers of e.g. unsubstituted butadiene and acrylonitrile.

The crystallinity of the copolymer of this application can be detected and measured using conventional methods such as X-ray diffraction, differential thermal analysis, dilatometry or infra-red spectroscopy. The results obtained by these different methods are comparable. For example, a 1:1 copolymer of isoprene and acrylonitrile prepared by copolymerizing in methylene chloride solution in the presence of a catalyst formed by mixing an ethyl aluminum dichloroide complex with acrylonitrile and vanadium oxychloride, showed at room temperature the following crystallinity:

Dilatometry _____ About 30%
Differential thermal analysis _____ About 33%
X-ray diffraction _____ About 25%

The second polymeric component used in the composition of this invention is a crystalline hydrocarbon polymer of a conjugated alkadiene having at least 85% and preferably more than 90% of the alkadiene units in the trans-1,4 configuration. The crystallinity of the polymer depends on the type of monomeric units and the degree of their stereoregularity, i.e. the trans-1,4 content, and may range from about 5% to about 60% as determined by X-ray diffraction at about 25° C. The preferred crystallinity range is from about 15–40%. The conjugated alkadiene is selected from those having 4–10 carbon atoms such as butadiene-1,3, isoprene, pentadiene-1,3, 2-ethyl butadiene-1,3, 2-amyl butadiene-1,3, although isoprene is preferred. The isoprene polymer includes a homopolymer and a copolymer with less than about 25 mole percent of a hydrocarbon comonomer such as butadiene-1,3, styrene, pentadiene-1,3. It has a number average molecular weight ranging from about 25,000 to about 1,000,000, although the preferred range is from about 50,000 to 300,000. The molecular weight may be calculated from the intrinsic viscosity measured at 30° C. in toluene, using the equation:

$$\text{Intrinsic Viscosity (deciliter/gram)} = 7.1 \times 10^4 (\text{mol. weight})^{0.66}$$

The preferred intrinsic viscosity is from about 0.5 to about 3.0 dl./g. It is convenient to express the molecular weight in terms of Mooney viscosity which is determined according to ASTM procedure D–1646–67. The trans-1,4 polymer of this invention has a Mooney viscosity ranging from about 5 to about 100, preferably between 20 and about 70.

The trans-1,4 polymers of conjugated alkadienes are known in the art and include naturally-occurring balata and gutta percha and synthetic polymers produced in the presence of stereospecific catalysts such as a mixture of aluminum trialkyls and titanium trichloride or vanadium trichloride.

The two polymers may be blended by any suitable means, for example, by admixing at a temperature above the melting point of at least one polymeric component on a rubber mixing device such as a two-roll mill, extruder or a Banbury type. Another method is to blend the two polymers in solution and then to recover the solid blend. The polymers are combined in a ratio so that the mixture contains from about 40 to 99 weight percent of the hydrocarbon polymer based on the weight of both polymeric components. The preferred composition contains about 10–40% of the copolymer such as the alternating copolymer of isoprene and acrylonitrile and about 60–90% of the hydrocarbon polymer, preferably trans-1,4 polyisoprene.

Other compounding ingredients may be added to the above blend. For example, it may be desirable to extend the blend with other polymers such as styrene-butadiene elastomers, high styrene-butadiene resins, butadiene or isoprene elastomers and polystyrene. They are normally admixed on a rubber mill or in an internal mixer e.g. of the Banbury type, in amounts of not more than 50 parts per 100 parts of the sum of the two essential polymers in the blend.

The composition of this invention may additionally contain a filler or pigment material admixed in an amount of less than 50 parts by weight per 100 parts of the essential polymers. The preferred amount is between 10 and 30 parts and the preferred filler is a non-reinforcing filler represented by titanium dioxide, barium sulfate, lithopone, calcium carbonate, clays, calcium sulfate and the like. Further additives may include curing agents, for example, a peroxide or a finely dispersed sulfur (0.5–5 parts) with an activator of sulfur vulcanization (0.5–10 parts) such as dibenzyl amine, zinc oxide and an accelerator of sulfur vulcanization; antioxidants; dyes; plasticizers and other conventional compounding ingredients, used in small amounts of less than about 2 parts, all parts being parts by weight per 100 parts of the blend of two essential polymers.

The composition is thermoplastic and can be molded or otherwise shaped at a temperature above the melting point of at least one crystalline component i.e. above about 50° C. In order to avoid premature vulcanization, it is preferred to mold under pressure at room temperature or slightly above, say at 25–35° C. The composition of this invention shows better flow properties than the unblended trans-1,4 polymer of conjugated alkadiene and the molding time may be significantly reduced. The molded composition may then be cured in the mold at a temperature of about 100° C. or higher to form vulcanized articles which are characterized by exceptional hardness and durability. In the case of golf ball covers, it is preferred to mold and cure the composition at a low temperature of below 50° C. The process consists of three main steps of (1) performing two half shells of the sulfur-curable composition of this invention by pressure molding at room temperature, followed by (2) placing a wound core between these shells and molding the ball assembly under pressure at a temperature below 50° C. so as not to damage the elastic threads in the wound core or affect their tension, and (3) curing the ball at a temperature of about 30° C. over a period of 10 days. The cured ball may be stored for prolonged periods of time without the danger of distorting the dimpled surface; they are then deflashed and painted as is customarily practised in the art.

The following examples illustrate and explain the invention in detail.

EXAMPLE 1

Four compositions were made by blending on a two-roll mill different amounts of a trans-1,4 polyisoprene and an alternating copolymer of alkadine and acrylonitrile. The trans-1,4 polyisoprene had a trans-1,4 content of about 95%, crystallinity of about 25% and a Mooney viscosity of 70 (M/L 4–10). The alternating copolymer was made in a solution polymerization medium using a complex polymerization catalyst comprising an aluminum diethyl dichloride and vanadyl chloride. It showed a crystallinity of about 20% measured by differential thermal analysis and an intrinsic viscosity of 0.9 dl./g. measured at 30° C. in a dimethyl formamide. The alkadiene units consisting of butadiene and isoprene copolymerized in a molar ratio of 3:7 were predominantly in the trans-1,4 configuration.

The polymer blends were then compounded on the mill using the following recipe in parts by weight per 100 parts of the polymeric constituents:

| | |
|---|---|
| Mixed polymers | 100 |
| Titanium dioxide | 10 |
| Zinc oxide | 5 |
| Dibenzyl amine | 1.25 |
| Sulfur | 0.75 |

The compounds were tested for melt flow index using a plastometer having an orifice, 2.095 mm. in diameter and 8.000 mm. long, through which the compounds were extruded at 100° C. under a load of 10 kg., essentially in accordance with ASTM D–1238–65T. The results were as follows:

| Compound | 1 | 2 | 3 | 4 |
|---|---|---|---|---|
| Trans-polyisoprene/alternating copolymer | 95/5 | 90/10 | 80/20 | 50/50 |
| Melt flow index (grams/10 minutes) | 0.50 | 0.78 | 0.86 | 1.86 |

A trans-1,4 polyisoprene control compound containing no alternating copolymer but compounded and handled in the manner as described above showed a melt flow index (M.F.I.) of only 0.10 grams/10 minutes.

Compounds 3 and 4 were molded under a pressure of about 100 kg./cm.² to form three pairs of half shells having a thickness of 2.0 mm. and external dimensions slightly larger than those of the regulation golf balls. Two molded shells were assembled so as to cover a wound centre golf ball core and then the assembly was molded under pressure at about 40° C. for 17 minutes to produce raw golf balls of required shape and size. Three golf balls were thus produced from each compound. One ball was tested in the raw state without curing, while the other two were dipped in a 4% solution of carbon disulfide for 30 minutes and then cured at 32° C. for 10 days. The raw ball and the cured balls were then subjected to golf ball tests. The control compound was included in the tests. The results are presented in Table I.

TABLE I.—GOLF BALL TESTING

|  | Cover compound | | | | | |
|---|---|---|---|---|---|---|
|  | 3 | | 4 | | Control | |
|  | Raw | Cured | Raw | Cured | Raw | Cured |
| Hardness (shore C) | 69 | 73 | 71 | 71 | 61 | 64 |
| Cut resistance* (height in cm.) | 14 | 19 | 13 | 14 | 10 | 18 |
| Rebound (percent) | 71 | ---- | 68 | 68 | 72 | ---- |
| Compression resistance** | | | | | | |
| Pole | 111 | ---- | 103 | 105 | 110 | ---- |
| Seam | 110 | ---- | 103 | 103 | 107 | ---- |

*The drop height required to cut through the cover using a 4 lb. cutting head weight, a 60° blade and a 1.01 cm. off-centre cut.
**Measured with a U.S.G.A. Compression Tester.

Covers made from Compounds 3 and 4 according to this invention showed good penetration into the wound core so that an intimate contact was established between the core and cover. These covers showed excellent response to buffing.

The data in the above table show that the golf balls with covers made of Compound 3 or 4 were harder than the control golf ball before and after curing. Cut resistance of the golf ball made with Compound 3 was also higher than that of the control ball, before and after curing. Rebound of the raw ball made with Compound 3 was 3% higher than that of Compound 4 and nearly the same as that of the control ball. The compression resistance measured in two directions, through the poles and in the seam plane, was high and nearly the same in both directions indicating good bonding between two half shells and between the shells and the core. The values for Compound 4 were satisfactory, although not as good as for Compound 3.

EXAMPLE 2

Three compositions were made as in Example 1 by blending the trans-1,4 polyisoprene used in Example 1 with two alternating copolymers of isoprene and acrylonitrile. The copolymers had identical composition and structure (25% crystalline, 49 mole percent acrylonitrile and 51 mole percent isoprene units predominantly in the trans-1,4 configuration) but different molecular weights and consequently different rheological properties. Copolymer 1 had an intrinsic viscosity of 0.5 dl./g. measured in dimethyl formamide at 30° C., and a melt flow index (M.F.I.) of 27 grams/10 minutes measured in a plastometer according to ASTM D-1238-65T at 150° C. under a load of 5 kg. Copolymer 2 had an intrinsic viscosity of 0.6 dl./g. and a M.F.I. of 8 grams/10 minutes.

The blends were compounded using the recipe shown in Example 1 and the compounds were tested for hardness and M.F.I. at 100° C. and 10 kg. load. Golf ball cover half shells were molded from each of these compounds and these shells were then used to assemble golf balls as described in Example 1. The golf balls, raw and cured, were tested and test results are presented in Table II.

TABLE II

| Cover compound | 1 | | 2 | | 3 | | Control |
|---|---|---|---|---|---|---|---|
| Trans-1,4 polyisoprene content (weight percent) | 85 | | 80 | | 50 | | [1] 100 |
| Intrinsic viscosity of alternating copolymer (dl./g.) | 0.5 | | 0.6 | | 0.6 | | ---- |
| M.F.I. (grams/10 minutes) | 0.7 | | 0.9 | | 0.2 | | 1.0 |
| Hardness (Shore C) | 75 | | 78 | | | | |
|  | Raw | Cured | Raw | Cured | Raw | Cured | Cured |
| Golf Ball tests: | | | | | | | |
| Hardness (Shore C) | 70 | 70 | 70 | 75 | 75 | 80 | 69 |
| Cut resistance (cm. of height) | 10 | 17 | 9 | 23 | 13 | 13 | 16 |
| Rebound (percent) | 71 | 71 | 71 | ---- | 70 | 67 | ---- |
| Compression resistance: | | | | | | | |
| Pole | 104 | 103 | ---- | 116 | 105 | 108 | ---- |
| Seam | 104 | 102 | ---- | 110 | 99 | 105 | ---- |

[1] Nat. balata.

The above table shows that the M.F.I. of the compounded blends is higher than the M.F.I. of the unblended trans-1,4 polyisoprene compound of Example 1 and close to that of the natural balata compound. Hardness of the uncured compound and of the assembled golf balls was higher than that of the balata control or of the unblended trans-1,4 polyisoprene control of Example 1. Cut resistance of cured golf ball samples made with cover Compounds 1 and 2 was better than that of the unblended natural balata cover

EXAMPLE 3

The 1:1 blend of trans-polyisoprene and alternating copolymer used in cover Compound 3 of Example 2 was compounded using the following recipe in parts by weight:

Polymer blend _____ 100
Styrene-butadiene rubbery copolymer (24% styrene, Mooney viscosity 51) _____ 20
Styrene-butadiene resinous copolymer[1] _____ 20
Titanium dioxide _____ 20
Zinc oxide _____ 5
Dibenzyl amine _____ 0.8
Sulfur _____ 1.0

[1] Styrene content 85% by weight.

The compound was molded into golf ball half shells, the shells were assembled with the wound centre core, pressure molded and cured to produce golf balls which were then tested as described in Example 1. The results are presented in Table III. A compound made of unblended trans-1,4 polyisoprene using the above recipe was used as the control.

TABLE III

| Cover compound | 1:1 blend | | Trans-polyisoprene (control) | |
|---|---|---|---|---|
| M.F.I. (grams/10 minutes) | 0.4 | | 0.1 | |
| Hardness (shore C) | 69 | | 65 | |
|  | Raw | Cured | Raw | Cured |
| Golf ball tests: | | | | |
| Hardness (shore C) | 64 | 70 | 64 | 68 |
| Cut resistance (cm.) | 13 | 12 | 12 | 16 |
| Rebound (percent) | 67 | 68 | 70 | 69 |
| Compression resistance: | | | | |
| Pole | 109 | 107 | 119 | ---- |
| Seam | 107 | 105 | 113 | ---- |
| Buffing | Good | | Fair | |

The preceding table shows the 1:1 blend of trans-1,4-polyisoprene and alternating copolymer has an improved melt flow index and higher hardness than the unblended trans-1,4 polyisoprene essentially without losing any of the other desired properties of the normally hard but moldable and curable compositions.

What is claimed is:

1. A curable composition of improved moldability comprising a mixture of:
    (A) a crystalline *alternating* copolymer of substantially equimolar amounts of a conjugated $C_{4-10}$ alkadiene and an acrylic nitrile, said alkadiene containing not less than about 40 mole percent of a 2-alkyl butadiene, more than 50% of said alkadiene being polymerized in the trans-1,4 configuration, said crystalline alternating copolymer having a crystallinity in its relaxed state at room temperature of about 5–35% as measured by X-ray diffraction, and
    (B) a crystalline hydrocarbon polymer of a $C_{4-10}$ conjugated alkadiene having at least 85% of alkadiene units in the trans-1,4 configuration and a crystallinity of about 5–60% at room temperature as measured by X-ray diffraction,
said mixture containing from about 40 to about 99 weight percent of polymer (B), based on the weight of (A) and (B).

2. The composition of Claim 1 wherein the alkadiene in copolymer (A) is isoprene or a blend of isoprene and butadiene-1,3, containing 50–80 mole percent of isoprene, and the acrylic nitrile is acrylonitrile.

3. The composition of Claim 1 wherein the alkadiene in copolymer (A) is an alternating copolymer of acrylonitrile and isoprene or a mixture of isoprene and butadiene at least 75% in the trans-1,4 configuration and polymer (B) has a crystallinity of about 15–40%.

4. The composition of Claim 1 wherein polymer (B) is natural balata.

5. The composition of Claim 1 wherein polymer (B) is a high molecular weight polymer of isoprene having more than about 90% of isoprene units in the trans-1,4 configuration and a Mooney viscosity (M/L 4' at 100° C.) of at least about 20.

6. The composition of Claim 1 additionally containing about 10 to 30 parts of a non-reinforcing filler, 0.5–3 parts of sulfur, 0.5–3.0 parts of an accelerator and 0–50 parts of polymeric extenders, said parts being parts by weight per 100 parts by weight of the sum of copolymer (A) and polymer (B).

7. The composition of Claim 1 whenever cured to a hard, cut-resistant vulcanizate.

8. A golf ball comprising an elastic core and a hard cover, said cover being of the composition as claimed in Claim 7.

9. The golf ball of Claim 8 wherein the elastic core is of a rubber elastic wound thread core and the cover is in an intimate contact with said core.

References Cited

UNITED STATES PATENTS

| | | | |
|---|---|---|---|
| 3,459,089 | 8/1969 | Clark | 260—894 X |
| 3,658,775 | 4/1972 | Kawasaki | 260—82.5 |
| 3,700,637 | 10/1972 | Finch | 260—83.3 |
| 3,362,937 | 1/1968 | Kent | 260—79.5 |

MORRIS LIEBMAN, Primary Examiner

R. ZAITLEN, Assistant Examiner

U.S. Cl. X.R.

260—5, 42.32, 82.5 R, 894; 273—281